United States Patent
Yoo et al.

(10) Patent No.: US 9,594,687 B2
(45) Date of Patent: Mar. 14, 2017

(54) VIRTUALIZATION-AWARE PREFETCHING

(71) Applicant: Google Inc., Mountain View, CA (US)

(72) Inventors: Richard Yoo, San Jose, CA (US);
Liqun Cheng, San Jose, CA (US);
Parthasarathy Ranganathan, San Jose, CA (US); Rama Krishna Govindaraju, San Jose, CA (US)

(73) Assignee: Google Inc., Mountain View, CA (US)

( * ) Notice: Subject to any disclaimer, the term of this patent is extended or adjusted under 35 U.S.C. 154(b) by 84 days.

(21) Appl. No.: 14/685,673

(22) Filed: Apr. 14, 2015

(65) Prior Publication Data

US 2016/0306743 A1   Oct. 20, 2016

(51) Int. Cl.
*G06F 12/08* (2016.01)
*G06F 9/455* (2006.01)
*G06F 12/02* (2006.01)

(52) U.S. Cl.
CPC ...... *G06F 12/0862* (2013.01); *G06F 9/45558* (2013.01); *G06F 12/0215* (2013.01); *G06F 2009/4557* (2013.01); *G06F 2009/45575* (2013.01); *G06F 2009/45583* (2013.01); *G06F 2212/602* (2013.01); *G06F 2212/654* (2013.01)

(58) Field of Classification Search
CPC ....... G06F 9/45558; G06F 2009/45575; G06F 12/0215; G06F 12/0862; G06F 2212/602
See application file for complete search history.

(56) References Cited

U.S. PATENT DOCUMENTS

| | | | |
|---|---|---|---|
| 6,490,658 B1 | 12/2002 | Ahmed | |
| 6,604,190 B1 * | 8/2003 | Tran | G06F 9/383 712/204 |
| 6,633,968 B2 | 10/2003 | Zwiegincew et al. | |
| 7,793,067 B2 | 9/2010 | Kegel | |
| 7,873,792 B2 | 1/2011 | Anand | |
| 2003/0105937 A1 | 6/2003 | Cooksey et al. | |
| 2009/0037663 A1* | 2/2009 | Hondou | G06F 12/0862 711/137 |
| 2012/0072911 A1 | 3/2012 | Whaley | |

(Continued)

OTHER PUBLICATIONS

International Search Report and Written Opinion in International Application No. PCT/US2016/027420, mailed Aug. 1, 2016, 10 pages.
"CPU cache", Wikipedia, the free encyclopedia, downloaded from the Internet on Feb. 9, 2015, http://en.wikipedia.org/wiki/CPU_cache#MULTILEVEL, 28 pages.
Amit, Nadav et al., "IOMMU: Strategies for Mitigating the IOTLB Bottleneck", Proceedings of the 2010 International Conference on Computer Architecture, 12 pages.

(Continued)

*Primary Examiner* — Hal Schnee
(74) *Attorney, Agent, or Firm* — Fish & Richardson P.C.

(57) ABSTRACT

Methods, systems, and apparatus, including computer programs encoded on computer storage media, for pre-fetching content. One of the systems includes a pre-fetcher configured to perform operations including determining, for a virtual machine executing on a device and using a first virtual machine physical address associated with the virtual machine, a second virtual machine physical address for data to pre-fetch for the execution of the virtual machine on the device, determining, using the second virtual machine physical address and an address mapping that associates virtual machine physical addresses for the virtual machine with device physical addresses for the device, a device physical address for the data, and requesting the data from a memory using the device physical address.

29 Claims, 4 Drawing Sheets

(56) References Cited

U.S. PATENT DOCUMENTS

| | | | |
|---|---|---|---|
| 2014/0297780 A1* | 10/2014 | Zhou | H04L 67/2847 709/216 |
| 2015/0039838 A1 | 2/2015 | Tarasuk-Levin et al. | |
| 2015/0082000 A1 | 3/2015 | Hong et al. | |
| 2015/0193155 A1* | 7/2015 | Sarcone | G06F 12/0862 714/764 |
| 2015/0227316 A1* | 8/2015 | Warfield | G06F 3/0608 711/103 |
| 2015/0277947 A1* | 10/2015 | Busaba | G06F 9/45558 718/1 |

OTHER PUBLICATIONS

Amit, Nadav et al., "VSwapper: A Memory Swapper for Virtualized Environments", Proceedings of the 19th International Conference on Architectural Support for Programming Languages and Operating Systems, 2014, 17 pages.

Bae, Chang et al., "Comparing Approaches to Virtualized Page Translation in Modern VMMs" Northwestern University Electrical Engineering and Computer Science Department, Technical Report, NWU-EECE-10-07, Apr. 26, 2010, 16 pages.

Basu, Arkaprava et al., "Efficient Virtual Memory for Big Memory Servers", Proceedings of the 40th Annual International Symposium on Computer Architecture, 2013, 12 pages.

Becerra, Yolanda et al., "Java Virtual Machine: the key for accurated memory prefetching", Proceedings of the International Conference on Software Engineering Research and Practice\Conference on Programming Language and Compilers, 2006, 7 pages.

Dreslinski, Ronald G. et al., "Analysis of Hardware Prefetching Across Virtual Page Boundaries", Proceedings of the 4th International Conference on Computing Frontiers, 2007, 9 pages.

Tang, Chunqiang, "FVD: a High-Performance Virtual Machine Image Format for Cloud", Proceedings of the 2011 USENIX Annual Technical Conference, 2011, 18 pages.

Zhang, Irene et al., "Optimizing VM Checkpointing for Restore Performance in VMware ESXi", Proceedings of the 2013 USENIX Annual Technical Conference, 12 pages.

* cited by examiner

VIRTUALIZATION-AWARE PREFETCHING

BACKGROUND

This specification relates to pre-fetching content for a cache.

Some processors include a hardware pre-fetcher that automatically determines data, e.g., instructions or other types of data that are likely to be used soon by the processor. A pre-fetcher may use various mechanisms to predict a likelihood of reuse or predict which data to pre-fetch. In some examples, the pre-fetcher may determine data stored adjacent to data currently being used, and which is not already stored in a cache, and pre-fetch the determined data, e.g., using a physical address of a device that includes the processor.

SUMMARY

In some implementations, a pre-fetcher uses a virtual machine's physical addresses (and not virtual machine's virtual addresses or the physical addresses of the actual hardware executing the virtual machine) to determine which pages, e.g., cache lines, to pre-fetch for a cache. The pre-fetcher may use a register value to determine which type of prefetching to perform, e.g., using a virtual machine's physical addresses or hardware physical addresses, depending on the application for which the pre-fetcher is getting data, e.g., when a single pre-fetcher fetches data for virtual machines and native applications. In some examples, a pre-fetcher may not have access to the virtual machine's physical addresses, so the pre-fetcher may need to be given access to L1 request traffic or other data that includes the virtual machine's physical addresses.

In general, one innovative aspect of the subject matter described in this specification can be embodied in methods that include the actions of determining, for a virtual machine executing on a device and by a pre-fetcher using a first virtual machine physical address associated with the virtual machine, a second virtual machine physical address for data to pre-fetch for the execution of the virtual machine on the device, determining, using the second virtual machine physical address and an address mapping that associates virtual machine physical addresses for the virtual machine with device physical addresses for the device, a device physical address for the data, and requesting the data from a memory using the device physical address. Other embodiments of this aspect include corresponding computer systems, apparatus, and computer programs recorded on one or more computer storage devices, each configured to perform the actions of the methods.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in a system that includes a pre-fetcher configured to perform operations including determining, for a virtual machine executing on a device and using a first virtual machine physical address associated with the virtual machine, a second virtual machine physical address for data to pre-fetch for the execution of the virtual machine on the device, determining, using the second virtual machine physical address and an address mapping that associates virtual machine physical addresses for the virtual machine with device physical addresses for the device, a device physical address for the data, and requesting the data from a memory using the device physical address. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. In some implementations, requesting the data from the memory using the device physical address includes requesting the data from a memory that is not a cache of the device using the device physical address. The method may include receiving, by the pre-fetcher, the first virtual machine physical address. Receiving, by the pre-fetcher, the first virtual machine physical address may include using, by the pre-fetcher, a cache port to retrieve the first virtual machine physical address, wherein a cache includes the cache port used by the pre-fetcher and another cache port used by a processor of the device. Receiving, by the pre-fetcher, the first virtual machine physical address may include using, by the pre-fetcher, a cache port to retrieve the first virtual machine physical address, wherein the cache port is used by the pre-fetcher and by a processor of the device to access a cache. Receiving, by the pre-fetcher, the virtual machine physical address may include receiving the virtual machine physical address from a processor of the device.

In some implementations, the method may include receiving the data from the memory in response to requesting the data from the memory using the device physical address, and storing the data in a cache. The method may include receiving the data from the memory in response to requesting the data from the memory using the device physical address, and storing the data in a buffer. The method may include determining, for each of multiple applications executing on the device, whether the application is a virtual machine, in response to determining for each application of the multiple applications that is a virtual machine, determining the second virtual machine physical address for the data to pre-fetch, and, in response to determining for each application of the multiple applications that is not a virtual machine, determining, by the pre-fetcher using a second device physical address, a third device physical address for other data to pre-fetch. Determining, for each of the multiple applications executing on the device, whether the application is a virtual machine may include determining whether a register on a processor of the device indicates that application is a virtual machine. The method may include detecting, for each application of the multiple applications that is a virtual machine, the execution of a launch instruction or a resume instruction to execute the virtual machine on the device, and in response to detecting the execution of the launch instruction or the resume instruction to execute the virtual machine on the device, setting the register to a value that indicates that the processor of the device is currently executing the virtual machine. The method may include detecting, for each application of the multiple applications that is a virtual machine, the execution of an exit instruction during the execution of the virtual machine on the device, and in response to detecting the execution of the exit instruction during the execution of the virtual machine on the device, setting the register to another value that indicates that the processor of the device is not currently executing the virtual machine.

In some implementations, determining the second virtual machine physical address for the data to pre-fetch for the execution of the virtual machine on the device may include determining the second virtual machine physical address for an instruction to pre-fetch for the execution of the virtual machine on the device. Requesting the data from the memory using the device physical address may include requesting the instruction from the memory using the device physical address.

In some implementations, requesting the data from the memory using the device physical address may include requesting the data from a memory that is not a cache of the device using the device physical address. The operations may include receiving the first virtual machine physical address. The system may include a processor on the device, and a cache on the processor including i) a first cache port configured to allow the pre-fetcher access to virtual machine physical addresses, ii) and a second cache port configured to allow the processor access to the cache, wherein receiving, by the pre-fetcher, the first virtual machine physical address may include using, by the pre-fetcher, the first cache port to retrieve the first virtual machine physical address.

In some implementations, the system may include a processor on the device, and a cache on the processor including a cache port configured to allow the pre-fetcher access to virtual machine physical addresses on the cache and allow the processor access to the cache, wherein receiving, by the pre-fetcher, the first virtual machine physical address may include using, by the pre-fetcher, the cache port to retrieve the first virtual machine physical address. The system may include a processor on the device configured to provide the virtual machine physical address to the pre-fetcher, wherein receiving, by the pre-fetcher, the virtual machine physical address may include receiving the virtual machine physical address from the processor.

In some implementations, the system may include a cache to store the requested data received from the memory. The system may include a buffer to store the requested data received from the memory. The system may include a second memory to store the address mapping that associates virtual machine physical addresses for the virtual machine with device physical addresses for a device. The system may include a processor that includes the second memory, the cache, and the pre-fetcher.

In some implementations, the operations may include determining, for each of multiple applications executing on the device, whether the application is a virtual machine, in response to determining for each application of the multiple applications that is a virtual machine, determining the second virtual machine physical address for the data to pre-fetch, and in response to determining for each application of the multiple applications that is not a virtual machine, determining, using a second device physical address, a third device physical address for other data to pre-fetch.

In some implementations, the system may include a register configured to store a value that indicates whether or not an application executing on a corresponding processor of the device is a virtual machine, wherein determining, for each of the multiple applications executing on the device, whether the application is a virtual machine may include determining whether the register on a processor of the device indicates that application is a virtual machine. The system may include a processor configured to: detect, for each application of the multiple applications that is a virtual machine, the execution of a launch instruction or a resume instruction to execute the virtual machine on the device, and in response to detecting the execution of the launch instruction or the resume instruction to execute the virtual machine on the device, set the register to a value that indicates that the processor of the device is currently executing the virtual machine. The processor may be configured to: detect, for each application of the multiple applications that is a virtual machine, the execution of an exit instruction during the execution of the virtual machine on the device, and in response to detecting the execution of the exit instruction during the execution of the virtual machine on the device, set the register to another value that indicates that the processor of the device is not currently executing the virtual machine.

In some implementations, determining the second virtual machine physical address for the data to pre-fetch for the execution of the virtual machine on the device may include determining the second virtual machine physical address for an instruction to pre-fetch for the execution of the virtual machine on the device, and requesting the data from the memory using the device physical address may include requesting the instruction from the memory using the device physical address.

The subject matter described in this specification can be implemented in particular embodiments and may result in one or more of the following advantages. In some implementations, a pre-fetcher that uses virtual machine physical addresses to pre-fetch data may pre-fetch multiple consecutive pages of data using virtual machine physical addresses, apply different pre-fetching algorithms to different virtual machines, or both. In some implementations, the pre-fetcher may have a higher effectiveness than other types of pre-fetchers that do not use virtual machine physical addresses to pre-fetch data, may reduce power consumption over the other types of pre-fetches, or both.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A pre-fetching system may allow a pre-fetcher to change its behavior depending on whether an application a processor is currently executing is a virtual machine. For instance, when a processor begins executing a virtual machine, e.g., using VMLAUNCH or VMRESUME, the processor may set a value of a register to indicate that the processor is executing a virtual machine. When the processor stops executing the virtual machine, e.g., based on VMEXIT, the processor may set the value of the register to indicate that the processor is not executing the virtual machine, and may change the value of the register as necessary based on a next application the processor executes.

When the register is not set, e.g., and indicates that a virtual machine is not being executed, the pre-fetcher makes pre-fetch predictions based on a host physical address stream for a host that includes the processor, e.g., a computer. When the register is set, e.g., and indicates that a virtual machine is being executed, the pre-fetcher makes pre-fetch predictions using a guest physical address stream, e.g., of the virtual machine.

When the registers is set, the pre-fetcher determines a candidate guest physical address for data to pre-fetch and uses a mapping between guest physical addresses and host physical addresses to translate the candidate guest physical address to a host physical address. In some examples, the pre-fetcher may have access to a page walker that provides the pre-fetcher with the guest physical address to host physical address mapping, e.g., using a nested page walk routine. In some implementations, e.g., when a processor maintains separate caches for nested page table lookup, a pre-fetcher may have access, e.g., using a port, to the separate cache for nested page table lookup.

Once the pre-fetcher determines the host physical address, the pre-fetcher sends the host physical address down the memory hierarchy to perform pre-fetch. In some examples, the pre-fetcher may include a pre-fetch priority tag in a pre-fetch request with the host physical address. Data identified by the host physical address may then be stored in a cache or a buffer.

Figure 1:
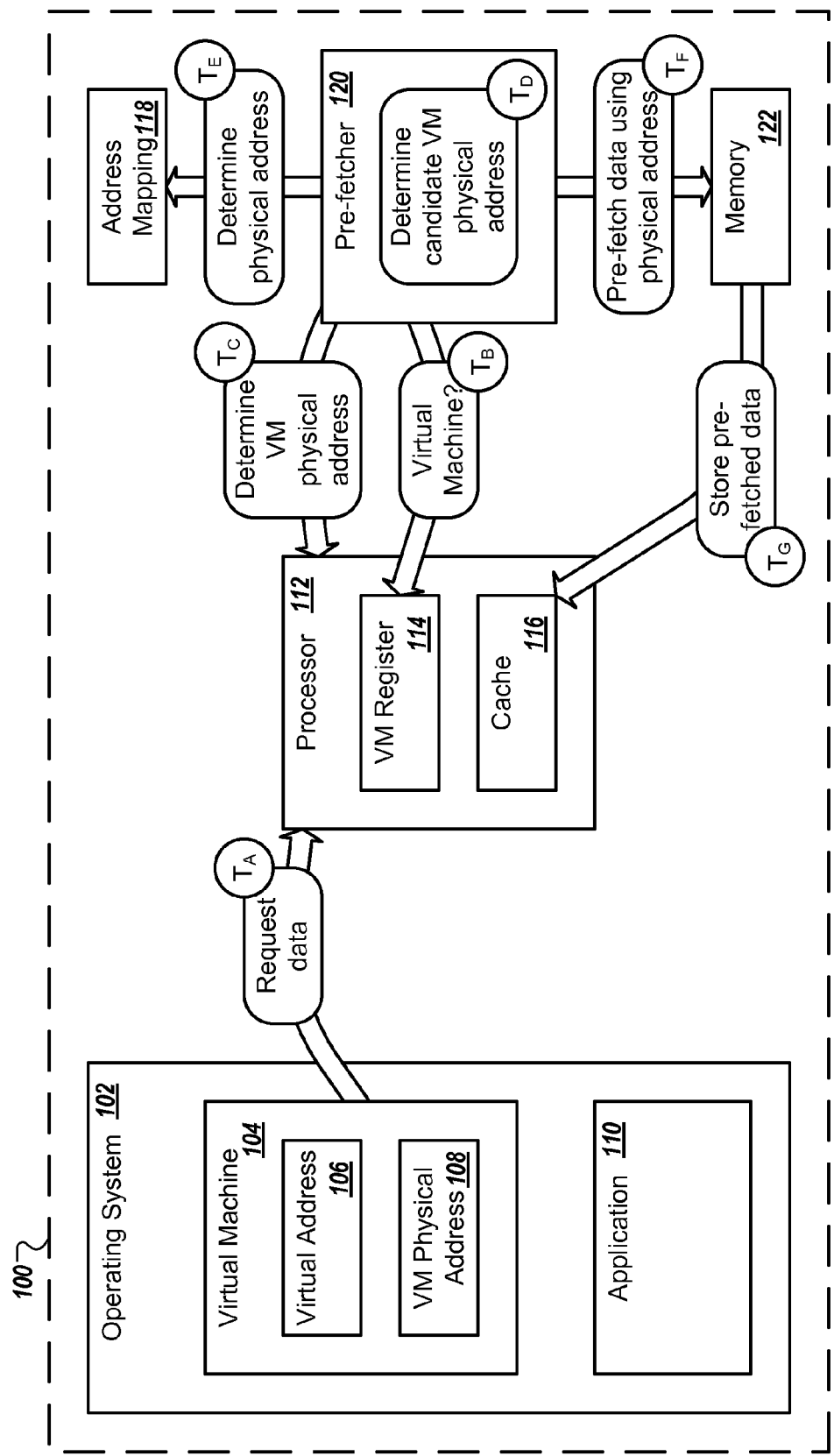
FIG. 1 is an example of a system in which a pre-fetcher pre-fetches data using a virtual machine physical address.

FIG. 1 is an example of a system 100 in which a pre-fetcher pre-fetches data using a virtual machine physical address. For instance, the system 100 includes an operating system 102 that may execute a virtual machine 104, an application 110, both, or a combination of multiple virtual machines and multiple applications.

Figure 2:
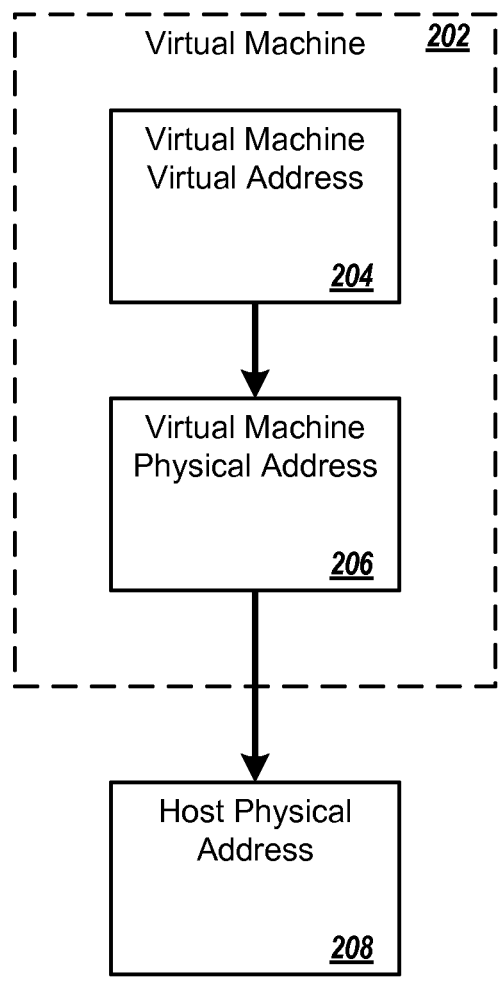
FIG. 2 shows an example of address translation in a virtualized environment.

Each virtual machine includes multiple virtual machine virtual addresses 106 and multiple virtual machine physical addresses 108, the latter of which may be mapped to device physical addresses using an address mapping 118. FIG. 2 shows an example of address translation in a virtualized environment 200, and may be used by the address mapping 118. For instance, a virtual machine 202 maps virtual machine virtual addresses 204 to virtual machine physical address 206. When the virtual machine 202 or an application executing on the virtual machine requires data, the virtual machine 202 provides a system, e.g., a memory management unit, with a virtual machine virtual address 204. The system translates the virtual machine virtual address 204 to a virtual machine physical address 206 and then translates the virtual machine physical address 206 to a host physical address 208, e.g., using nested page tables. The system may then request data identified using the host physical address 208 and provide the data to the virtual machine 202.

For example, referring to FIG. 1, the virtual machine 104, at time $T_A$, requests data from a processor 112. The request may include a virtual machine virtual address 106 or a virtual machine physical address 108. The requested data may include information bits on which a sequence of operators, e.g., "instructions," operate. In some examples, the requested data may include instructions, e.g., the request may be a request for instructions.

A processor 112 acts on the request, e.g., identifies data responsive to the request. For instance, the processor 112 may check a cache 116 to determine whether the cache 116 includes the requested data. In some examples, the processor 112 may confirm that a virtual machine register 114 is set when acting on the request. In some examples, the processor 112 sets the virtual machine register 114 when the processor 112 begins execution of a virtual machine, irrespective of the virtual machine being executed, and unsets the virtual machine register 114 when the processor 112 stops executing the virtual machine, e.g., in response to a pause or exit command.

The processor 112, or a component of the processor, e.g., a memory management unit, may use an address mapping 118 to determine a device physical address for the requested data. For instance, the processor 112 may use nested page tables to determine the device physical address using a virtual machine virtual address 106. In some examples, the processor 112 may use a page table to determine the device physical address using a virtual machine physical address 108. The address mapping 118 may be included on the processor 112 or another component of the system 100.

The processor 112 determines whether the requested data is in the cache 116 or should be requested from another memory. The processor 112 may retrieve the requested data and provide the requested data to the virtual machine 104.

At time $T_B$, a pre-fetcher 120 determines whether the processor 112 is acting on a request from a virtual machine. For instance, the pre-fetcher 120 may check the virtual machine register 114 to determine whether a bit is set that indicates that the processor 112 is acting on a request from a virtual machine. The pre-fetcher 120 may use any appropriate method to determine whether the processor 112 is acting on a request from a virtual machine.

The pre-fetcher 120 may determine whether the processor 112 is acting on a request from a virtual machine any time after the processor 112 receives the data request. For instance, the processor 112 maybe retrieving the requested data or performing an operation on or with the requested data while the pre-fetcher 120 determines whether the processor is acting on a request from a virtual machine.

When the pre-fetcher 120 determines that the processor 112 is acting on a request from a virtual machine, whether the virtual machine 104 or another virtual machine executing in the system 100, the pre-fetcher 120, during time $T_C$, determines the virtual machine physical address that corresponds to the data request. The pre-fetcher 120 may access a virtual address stream in the processor 112, such as L1 cache request traffic, to determine the virtual machine physical address, e.g., by receiving a virtual machine virtual address and using the address mapping to determine the virtual machine physical address. In some implementations, the pre-fetcher 120 determines the virtual machine physical address or the virtual machine virtual address from the processor 112. The pre-fetcher 120 may use any appropriate method to determine the virtual machine physical address.

In some examples, the pre-fetcher 120 may have access to the virtual machine virtual addresses included in requests sent to the processor 112 and not the virtual machine physical addresses. In these examples, the pre-fetcher 120 may use the address mapping 118 to determine a virtual machine physical address using a virtual machine virtual address included in the data request.

Once the pre-fetcher 120 determines the virtual machine physical address for the data request, the pre-fetcher 120 determines a candidate virtual machine physical address, at time $T_D$, for additional data that should be pre-fetched and stored in the cache 116 or a buffer, e.g., a next cache line to pre-fetch. For instance, the pre-fetcher 120 may determine a candidate address adjacent to the virtual machine physical address and use the candidate address to pre-fetch the additional data. In some examples, the pre-fetcher 120 may use an algorithm that predicts, using the virtual machine physical address, which additional data may be requested by the virtual machine 104 and uses the virtual machine physical address for that additional data as the candidate address. In some implementations, the pre-fetcher 120, e.g., a spatial pre-fetcher, can use a bit vector representing which data should be pre-fetched. The pre-fetcher may use the bit vector, combined with a base address requested by a trigger event, e.g., the virtual machine physical address included in the data request at time $T_A$, to determine a list of addresses to pre-fetch. The pre-fetcher 120 may use any appropriate algorithm to determine the candidate address, e.g., to perform pre-fetching using a virtual machine physical address. The pre-fetcher 120 may determine the candidate address whether or not the processor 112 retrieves the requested data from the cache 116.

At time $T_E$, the pre-fetcher 120 determines a device physical address for the candidate virtual machine physical address using the address mapping 118. The pre-fetcher 120, at time $T_F$, uses the device physical address to pre-fetch the additional data. For instance, the pre-fetcher 120 sends a request for the additional data to a memory 122 associated with the device physical address or otherwise causes the pre-fetching of the additional data from the memory 122. In some examples, the memory 122 is not a cache in the system 100 but may include a cache. For instance, the memory may be a random access memory, or any other appropriate type of memory.

The memory 122 uses the device physical address to retrieve the additional data. The memory 122, or another component in the system 100, stores the additional data, at time $T_G$, in the cache 116 or a buffer. In some examples, the memory 122 provides the additional data to the processor 112 and a component of the processor 112 stores the additional data in the cache 116 or the buffer. The buffer may be a storage for pre-fetched data.

When the pre-fetcher 120 determines that the processor 112 is not acting on a request from a virtual machine and is acting on a request from an application, whether the application 110 or another application executing in the system 100, the pre-fetcher 120 uses a device physical address that corresponds to the requested data to determine a candidate device physical address for other additional data to pre-fetch for the application. The pre-fetcher 120 may use any appropriate algorithm to determine the candidate device physical address using the device physical address, e.g., to perform pre-fetching for a native application of the operating system 102. In some examples, the pre-fetcher 120 may use information about relative priorities of various jobs when making a decision of what data should be pre-fetched. For instance, the pre-fetcher 120 may use priority information for different applications executing on the system 100 to determine for which application data should be pre-fetched.

The pre-fetcher 120 may send the candidate device physical address to a memory, e.g., the memory 122, to pre-fetch the other additional data. The system 100, e.g., the processor 112 or the memory 122, may store the other additional data in the cache 116 or a buffer.

In some implementations, the pre-fetcher 120 is part of the processor 112, e.g., the pre-fetcher 120 is a hardware pre-fetcher. In some implementations, the pre-fetcher 120 is a software pre-fetcher.

Figure 3:
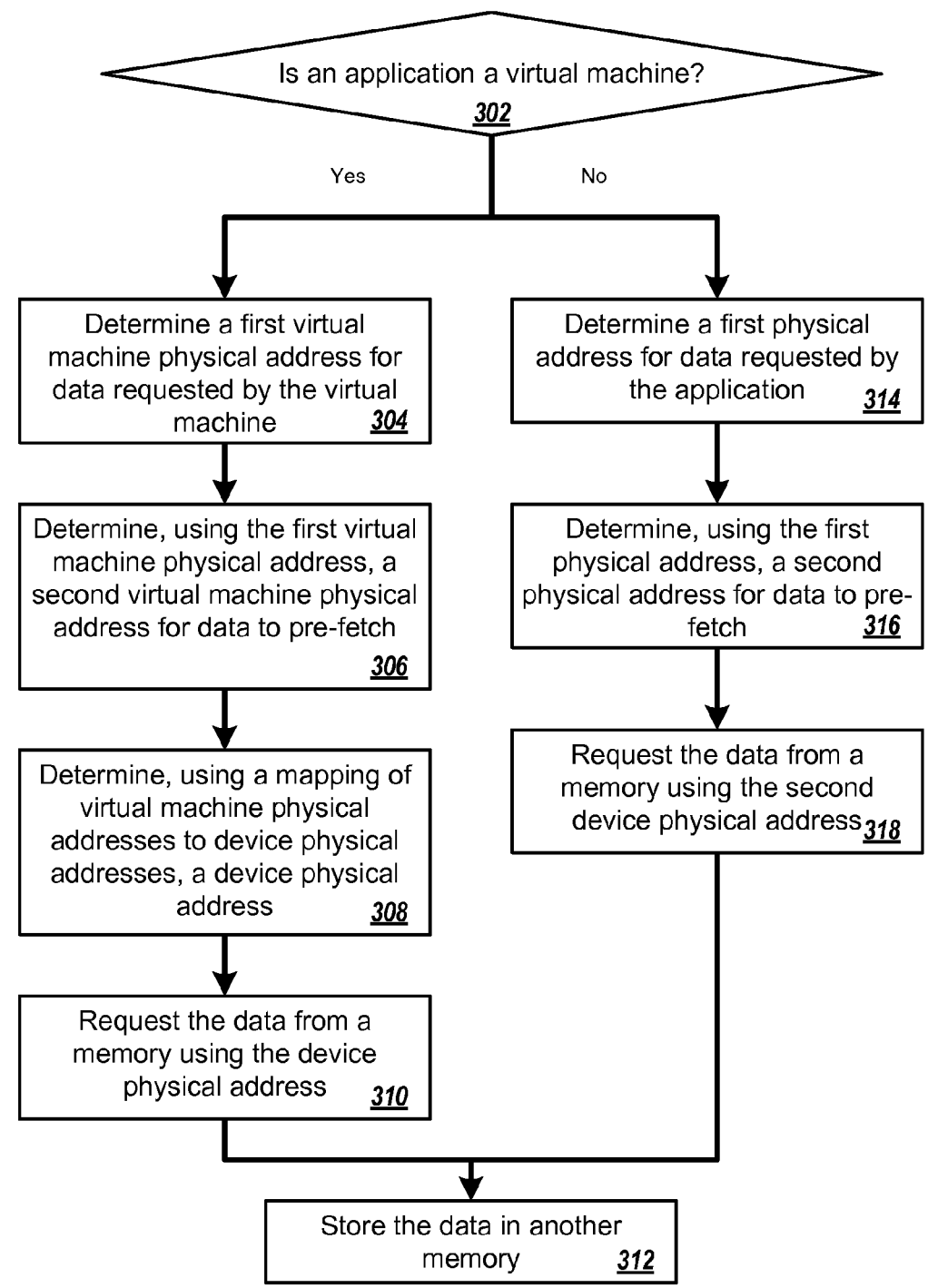
FIG. 3 is a flow diagram of a process for storing pre-fetched data in a memory.

FIG. 3 is a flow diagram of a process 300 for storing pre-fetched data in a memory. For example, the process 300 can be used by the pre-fetcher 120 from the system 100.

A pre-fetcher determines whether an application is a virtual machine (302). For instance, the pre-fetcher checks a value, e.g., a bit, on a processor to determine whether the application is a virtual machine. In some implementations, the pre-fetcher resides on the processor. In some examples, the pre-fetcher is located on another portion of a device that includes the processor.

In response to determining that the application is a virtual machine, the pre-fetcher determines a first virtual machine physical address for data requested by the virtual machine (304). For instance, the pre-fetcher accesses a virtual address stream of the virtual machine. The pre-fetcher determines a virtual machine virtual address from the virtual address stream and uses the virtual address to determine a virtual machine physical address.

In some examples, the pre-fetcher has access to a cache port of a cache on the processor executing the virtual machine. The pre-fetcher accesses the cache port to determine the virtual machine virtual address or the virtual machine physical address. In some implementations, the pre-fetcher uses the same cache port as the processor to access the cache. In these implementations, a system may use relative priority schemes when allowing the pre-fetcher and the processor access to the cache using the same cache port. In some implementations, the pre-fetcher uses a different cache port than a cache port used by the processor to access the cache.

The pre-fetcher determines, using the first virtual machine physical address, a second virtual machine physical address for data to store in a cache (306). The pre-fetcher may use any appropriate algorithm to determine the second virtual machine physical address for pre-fetching data.

The pre-fetcher determines, using a mapping of virtual machine physical addresses to device physical addresses, a device physical address (308). For instance, the pre-fetcher uses an address mapping, such as a page table or a nested page table, to determine the device physical address.

The pre-fetcher requests the data from a memory using the device physical address (310). For example, the pre-fetcher requests the data from a random access memory.

The pre-fetcher stores the data in another memory (312). The other memory may include a cache on the processor, a buffer, e.g., on the processor, or another memory that has a lower latency than the memory from which the data was pre-fetched.

In response to determining that the application is not a virtual machine, the pre-fetcher determines a first physical address for data requested by the application (314). For instance, the application may be an office productivity application, a web browser, or a game, and the pre-fetcher determines the first physical address for that application.

The pre-fetcher determines, using the first physical address, a second physical address for data to pre-fetch (316). The pre-fetcher may use any appropriate algorithm to determine the second physical address for pre-fetching data.

The pre-fetcher requests the data from the memory using the second device physical address (318). The pre-fetcher then stores the data in the other memory, e.g., a cache or a buffer. For instance, the pre-fetcher performs step 312.

In some implementations, the process 300 can include additional steps, fewer steps, or some of the steps can be divided into multiple steps. For example, the pre-fetcher may perform steps 302 through 312 and not steps 314 through 318. In some examples, the pre-fetcher may perform steps 304 through 308 or steps 304 through 310 without performing the other steps.

In some implementations, a pre-fetching system may include other appropriate mechanisms to allow the pre-fetcher to determine that a processor is executing a virtual machine. For instance, the pre-fetcher may read a value of a register to determine that the processor is executing a virtual machine.

In some implementations, a pre-fetching system may include multiple levels of address layers, e.g., virtual machines executing within virtual machines, and a pre-fetcher may determine what data to pre-fetch using information about the multiple levels of address layers. For instance, the pre-fetcher may determine a highest address layer, e.g., for the virtual machine executing in the level furthest from the operating system executing on the pre-fetching system, and use information about physical addresses for that highest address layer when making pre-fetching decisions.

In some implementations, when a single system, e.g., device or processor, executes multiple virtual machines, a pre-fetcher may apply different pre-fetching algorithms to each of the virtual machines or to some of the virtual machines. For instance, the pre-fetcher may pre-fetch data for every data request for a first virtual machine and pre-fetch data for every tenth data request for a second virtual machine. In some examples, the pre-fetcher may delay or omit pre-fetch requests or both to control bandwidth, e.g., the number of pre-fetch requests sent, or quality of service guarantees, or both.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Figure 4:
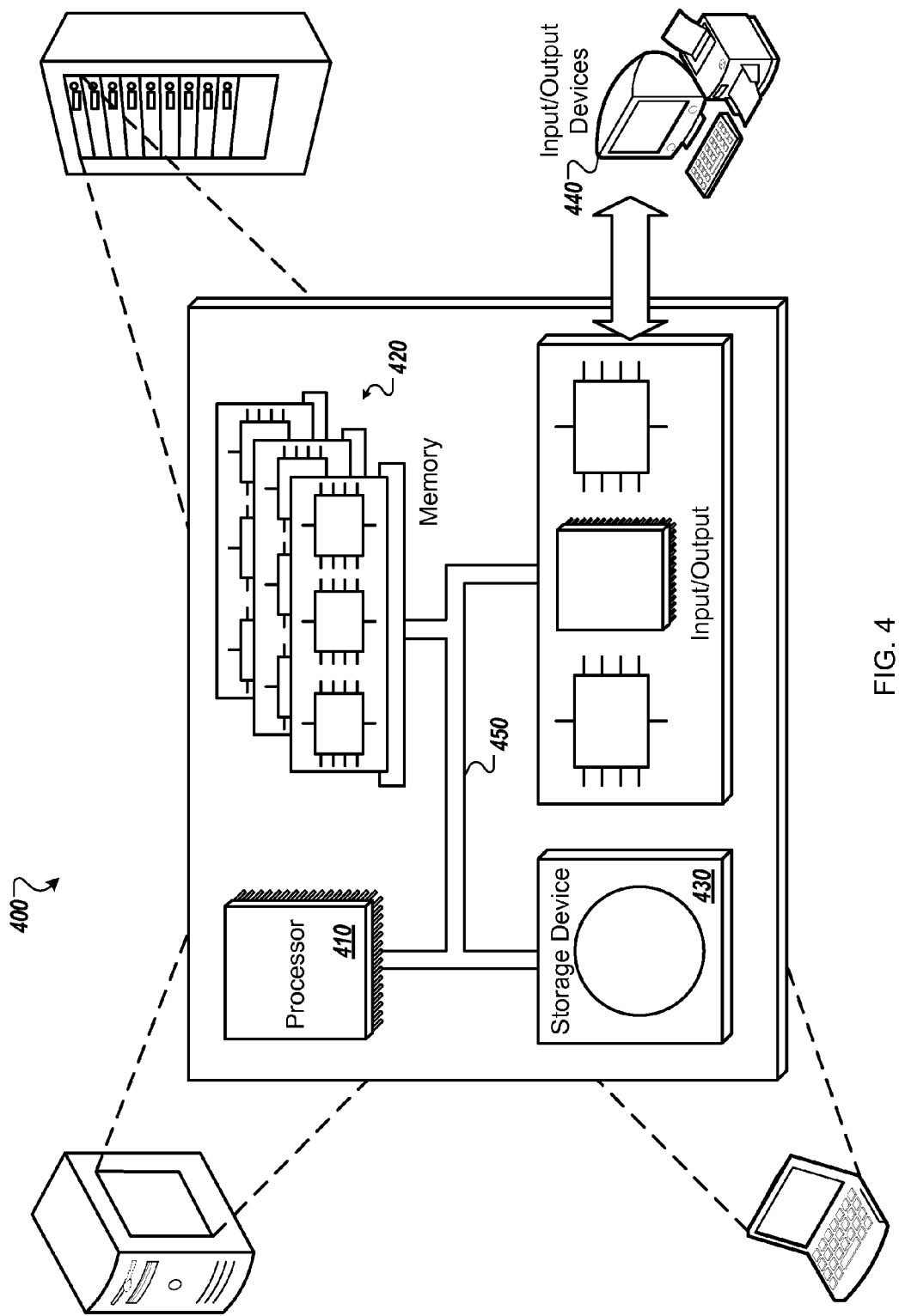
FIG. 4 is a block diagram of a computing system that can be used in connection with computer-implemented methods described in this document.

An example of one such type of computer is shown in FIG. 4, which shows a schematic diagram of a generic computer system 400. The system 400 can be used for the operations described in association with any of the computer-implement methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous. In some implementations, one component, a subset of the components, or all of the above hardware components may be replaced with equivalent software or hybrid components that implement the same functionality.

What is claimed is:

1. A method comprising:
   determining, for a first application executing on a device, whether the first application is a virtual machine;
   in response to determining that the first application is a virtual machine:
      determining, for the virtual machine executing on the device and by a pre-fetcher using a first virtual machine physical address associated with the virtual machine, a second virtual machine physical address for data to pre-fetch for the execution of the virtual machine on the device;
      determining, using the second virtual machine physical address and an address mapping that associates virtual machine physical addresses for the virtual machine with device physical addresses for the device, a device physical address for the data; and
      requesting the data from a memory using the device physical address;
   determining, for a second application executing on the device that is a different application from the first application, whether the second application is a virtual machine; and
   in response to determining that the second application is not a virtual machine:
      determining, by the pre-fetcher using a second device physical address, a third device physical address for other data to pre-fetch.

2. The method of claim 1, wherein requesting the data from the memory using the device physical address comprises requesting the data from a memory that is not a cache of the device using the device physical address.

3. The method of claim 1, comprising:
   receiving, by the pre-fetcher, the first virtual machine physical address.

4. The method of claim 3, wherein receiving, by the pre-fetcher, the first virtual machine physical address comprises using, by the pre-fetcher, a cache port to retrieve the first virtual machine physical address, wherein a cache includes the cache port used by the pre-fetcher and another cache port used by a processor of the device.

5. The method of claim 3, wherein receiving, by the pre-fetcher, the first virtual machine physical address comprises using, by the pre-fetcher, a cache port to retrieve the first virtual machine physical address, wherein the cache port is used by the pre-fetcher and by a processor of the device to access a cache.

6. The method of claim 3, wherein receiving, by the pre-fetcher, the virtual machine physical address comprises receiving the virtual machine physical address from a processor of the device.

7. The method of claim 1, comprising:
   receiving the data from the memory in response to requesting the data from the memory using the device physical address; and
   storing the data in a cache.

8. The method of claim 1, comprising:
   receiving the data from the memory in response to requesting the data from the memory using the device physical address; and
   storing the data in a buffer.

9. The method of claim 1, wherein:
   determining, for the first application, whether the first application is a virtual machine comprises determining, while the device is executing the first application, whether a register on a processor of the device indicates that the first application is a virtual machine; and
   determining, for the second application, whether the second application is a virtual machine comprises determining, while the device is executing the second application, whether the register on the processor of the device indicates that the second application is a virtual machine.

10. The method of claim 9, comprising:
  detecting, for the first application, the execution of a launch instruction or a resume instruction to execute the virtual machine on the device; and
  in response to detecting the execution of the launch instruction or the resume instruction to execute the virtual machine on the device, setting the register to a value that indicates that the processor of the device is currently executing the virtual machine.

11. The method of claim 10, comprising:
  detecting, for the first application, the execution of an exit instruction during the execution of the virtual machine on the device; and
  in response to detecting the execution of the exit instruction during the execution of the virtual machine on the device, setting the register to another value that indicates that the processor of the device is not currently executing the virtual machine.

12. The method of claim 1, wherein:
  determining the second virtual machine physical address for the data to pre-fetch for the execution of the virtual machine on the device comprises determining the second virtual machine physical address for an instruction to pre-fetch for the execution of the virtual machine on the device; and
  requesting the data from the memory using the device physical address comprises requesting the instruction from the memory using the device physical address.

13. A system comprising:
  a pre-fetcher; and
  a non-transitory computer readable storage medium storing instructions executable by the pre-fetcher that upon such execution cause the pre-fetcher to perform operations comprising:
    determining, for a first application executing on a device, whether the first application is a virtual machine;
    in response to determining that the first application is a virtual machine:
      determining, for the virtual machine and using a first virtual machine physical address associated with the virtual machine, a second virtual machine physical address for data to pre-fetch for the execution of the virtual machine;
      determining, using the second virtual machine physical address and an address mapping that associates virtual machine physical addresses for the virtual machine with device physical addresses for the device, a device physical address for the data; and
      requesting the data from a memory using the device physical address;
    determining, for a second application that is a different application from the first application, whether the second application is a virtual machine; and
    in response to determining that the second application is not a virtual machine:
      determining, using a second device physical address, a third device physical address for other data to pre-fetch.

14. The system of claim 13, wherein requesting the data from the memory using the device physical address comprises requesting the data from a memory that is not a cache of the device using the device physical address.

15. The system of claim 13, the operations comprising:
  receiving the first virtual machine physical address.

16. The system of claim 15, comprising:
  a processor on the device; and
  a cache on the processor including i) a first cache port configured to allow the pre-fetcher access to virtual machine physical addresses, ii) and a second cache port configured to allow the processor access to the cache, wherein receiving, by the pre-fetcher, the first virtual machine physical address comprises using, by the pre-fetcher, the first cache port to retrieve the first virtual machine physical address.

17. The system of claim 15, comprising:
  a processor on the device; and
  a cache on the processor including a cache port configured to allow the pre-fetcher access to virtual machine physical addresses on the cache and allow the processor access to the cache, wherein receiving, by the pre-fetcher, the first virtual machine physical address comprises using, by the pre-fetcher, the cache port to retrieve the first virtual machine physical address.

18. The system of claim 15, comprising:
  a processor on the device configured to provide the virtual machine physical address to the pre-fetcher, wherein receiving, by the pre-fetcher, the virtual machine physical address comprises receiving the virtual machine physical address from the processor.

19. The system of claim 13, comprising:
  a cache to store the requested data received from the memory.

20. The system of claim 13, comprising:
  a buffer to store the requested data received from the memory.

21. The system of claim 13, comprising:
  a second memory to store the address mapping that associates virtual machine physical addresses for the virtual machine with device physical addresses for the device.

22. The system of claim 21, comprising:
  a processor that includes the second memory, a cache to store the requested data received from the memory, and the pre-fetcher.

23. The system of claim 13, comprising:
  a register configured to store a value that indicates whether or not an application executing on a corresponding processor of the device is a virtual machine, wherein:
  determining, for the first application, whether the first application is a virtual machine comprises determining whether the register on a processor of the device indicates that the first application is a virtual machine; and
  determining, for the second application, whether the second application is a virtual machine comprises determining whether the register on the processor of the device indicates that the second application is a virtual machine.

24. The system of claim 23, comprising:
  a processor configured to:
    detect, for the first application, the execution of a launch instruction or a resume instruction to execute the virtual machine on the device; and
    in response to detecting the execution of the launch instruction or the resume instruction to execute the virtual machine on the device, set the register to a value that indicates that the processor of the device is currently executing the virtual machine.

25. The system of claim 24, wherein the processor is configured to:

detect, for the first application, the execution of an exit instruction during the execution of the virtual machine on the device; and in response to detecting the execution of the exit instruction during the execution of the virtual machine on the device, set the register to another value that indicates that the processor of the device is not currently executing the virtual machine.

26. The system of claim 13, wherein:

determining the second virtual machine physical address for the data to pre-fetch for the execution of the virtual machine on the device comprises determining the second virtual machine physical address for an instruction to pre-fetch for the execution of the virtual machine on the device; and requesting the data from the memory using the device physical address comprises requesting the instruction from the memory using the device physical address.

27. A non-transitory computer readable storage medium storing instructions executable by a data processing apparatus and upon such execution cause the data processing to perform operations comprising:

determining, for a first application executing on a device, whether the first application is a virtual machine;

in response to determining that the first application is a virtual machine:

determining, for the virtual machine executing on the device and using a first virtual machine physical address associated with the virtual machine, a second virtual machine physical address for data to pre-fetch for the execution of the virtual machine on the device;

determining, using the second virtual machine physical address and an address mapping that associates virtual machine physical addresses for the virtual machine with device physical addresses for the device, a device physical address for the data; and requesting the data from a memory using the device physical address;

determining, for a second application executing on the device that is a different application from the first application, whether the second application is a virtual machine; and in response to determining that the second application is not a virtual machine:

determining, by the pre-fetcher using a second device physical address, a third device physical address for other data to pre-fetch.

28. The computer readable storage medium of claim 27, the operations comprising:

receiving, by the pre-fetcher, the first virtual machine physical address.

29. The computer readable storage medium of claim 28, wherein receiving, by the pre-fetcher, the first virtual machine physical address comprises using, by the pre-fetcher, a cache port to retrieve the first virtual machine physical address, wherein a cache includes the cache port used by the pre-fetcher and another cache port used by a processor of the device.

\* \* \* \* \*